United States Patent
Nakajima et al.

(10) Patent No.: US 11,535,174 B2
(45) Date of Patent: Dec. 27, 2022

(54) EXTERNAL SENSOR ATTACHMENT PORTION STRUCTURE

(71) Applicant: HONDA MOTOR CO., LTD., Tokyo (JP)

(72) Inventors: Takahiro Nakajima, Wako (JP); Akihiro Kitagawa, Wako (JP); Kazuaki Hiwatashi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 343 days.

(21) Appl. No.: 16/871,411

(22) Filed: May 11, 2020

(65) Prior Publication Data

US 2020/0361398 A1 Nov. 19, 2020

(30) Foreign Application Priority Data

May 13, 2019 (JP) .............................. JP2019-090830

(51) Int. Cl.
*B60R 11/04* (2006.01)
*B60R 13/04* (2006.01)
(Continued)

(52) U.S. Cl.
CPC ................. *B60R 11/04* (2013.01); *B60J 1/20* (2013.01); *B60R 13/04* (2013.01);
(Continued)

(58) Field of Classification Search
CPC ... B60R 11/04; B60R 13/04; B60R 2011/004; B60R 2011/005; B60R 11/00; B60R 19/483; B60R 2011/0042; B60J 1/20; G01S 2013/93275; G01S 2013/9327; G01S 7/027; G01S 7/03; G01S 7/4813; G01S 7/521; G01S 13/931; G01S 17/931; G01S 2013/9323; G01S 2013/9324; G01S 2013/93271; B62D 35/00
See application file for complete search history.

(56) References Cited

U.S. PATENT DOCUMENTS 11,046,255 B2 * 6/2021 Miwa .................... B60R 19/483

FOREIGN PATENT DOCUMENTS

| CN | 207859904 U | * | 9/2018 |
| JP | 2001039243 A | * | 2/2001 |
| JP | 2013-076704 A |   | 4/2013 |

* cited by examiner

*Primary Examiner* — Bernarr E Gregory
*Assistant Examiner* — Yonghong Li
(74) *Attorney, Agent, or Firm* — Rankin, Hill & Clark LLP

(57) ABSTRACT

In an external sensor attachment portion structure of the present invention, an external sensor includes: a sensor main body including a detection unit that detects external information; a sensor attachment bracket used to attach the sensor main body to a vehicle body frame member; and a sensor garnish including a window portion through which the detection unit is exposed in front view. The sensor garnish is provided on an outer side of the host vehicle so as to expose the detection unit of the external sensor and cover the sensor main body and the sensor attachment bracket excluding the detection unit. Small gaps are provided between the sensor main body and a window frame of the window portion in the sensor garnish. The window frame includes a noise suppression portion that suppresses wind noise due to airflow passing through the gaps along a rearward direction of the host vehicle.

5 Claims, 11 Drawing Sheets

(51) Int. Cl.
  *B60J 1/20*   (2006.01)
  *G01S 7/03*    (2006.01)
  *B60R 11/00*   (2006.01)
  *G01S 7/481*   (2006.01)
  *G01S 7/521*   (2006.01)
  *G01S 7/02*    (2006.01)
  *G01S 13/931*  (2020.01)

(52) U.S. Cl.
  CPC ... *B60R 2011/004* (2013.01); *B60R 2011/005* (2013.01); *G01S 7/027* (2021.05); *G01S 7/03* (2013.01); *G01S 7/4813* (2013.01); *G01S 7/521* (2013.01); *G01S 2013/9327* (2020.01); *G01S 2013/93275* (2020.01)

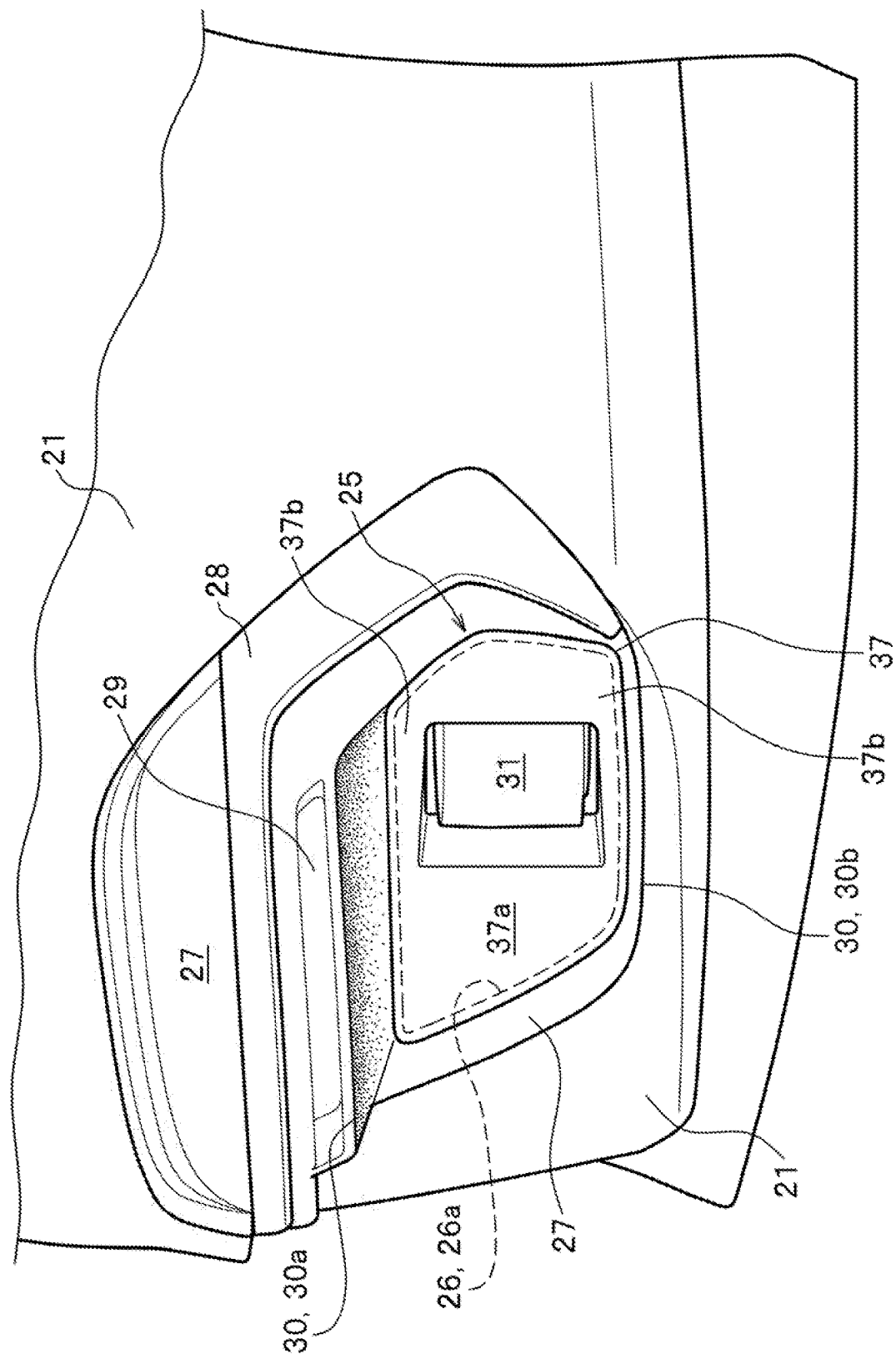

EXTERNAL SENSOR ATTACHMENT PORTION STRUCTURE

CROSS-REFERENCE TO RELATED APPLICATION

This application is based upon and claims priority from the Japanese Patent Application No. 2019-090830, filed on May 13, 2019, the entire contents of which are incorporated herein by reference.

BACKGROUND OF THE INVENTION

1. Field of the Invention

The present invention relates to an external sensor attachment portion structure used to attach an external sensor that detects external information on an object around a host vehicle to a vehicle body structure of the host vehicle.

2. Description of the Related Art

Recently, there have been popular so-called automated driving vehicles each of which detects external information on an object around the host vehicle by, for example, an external sensor such as a radar ranging sensor and executes an autonomous traveling control of the host vehicle including steering and accelerating or decelerating based on the detected external information and the like.

For example, Japanese Patent Application Publication No. 2013-76704 discloses an invention of an in-vehicle radar device including: a transmission and reception unit that transmits an electromagnetic wave and receives a reflected wave; a detection unit that detects the position of an object based on the reflected wave of the electromagnetic wave from the object; and a cover member that covers the transmission and reception unit such that a transmission and reception surface of the transmission and reception unit and a back surface of the cover member face each other, in which the cover member includes at least a covering portion that covers the transmission and reception surface and a lower protrusion portion that is provided below the covering portion and formed to protrude on a front surface side of the cover member from the covering portion.

In the in-vehicle radar device (external sensor) of Japanese Patent Application Publication No. 2013-76704, the cover member includes at least the covering portion that covers the transmission and reception surface and the lower protrusion portion that is formed to protrude from the covering portion on the front surface side of the cover member. When, for example, a vehicle wheel in the vehicle rotates and splashes water drops and the like from below, the above structure can prevent the water drops and the like from adhering to the front surface of the covering portion. Consequently, the in-vehicle radar device can prevent the attenuation of the electromagnetic wave and detect precisely the position of the object.

SUMMARY OF THE INVENTION

For example, an external sensor like the in-vehicle radar device is usually attached to a vehicle body structure such as a bumper member included in the host vehicle such that its detection unit is exposed through a window portion provided in the vehicle body structure. In this case, a gap is provided between the window portion of the vehicle body structure and the detection unit of the external sensor. In this gap, airflow is generated while the vehicle is traveling. Consequently, there is a problem that this airflow causes a vortex, thereby generating wind noise like a whistle.

The present invention is made in the light of the above-described circumstances, and an object thereof is to provide an external sensor attachment portion structure capable of suppressing wind noise generated in the attachment portion of the external sensor as much as possible.

In order to achieve the above-described object, an external sensor attachment portion structure based on a first aspect is an external sensor attachment portion structure that is used to attach an external sensor that detects external information on an object around a host vehicle to a vehicle body structure of the host vehicle, the external sensor including: a sensor main body including a detection unit that detects the external information; an attachment bracket used to attach the sensor main body to the vehicle body structure; and a sensor garnish including a window portion through which the detection unit is exposed in front view, in which the sensor garnish is provided on outer side of the host vehicle so as to expose the detection unit of the external sensor and cover at least the sensor main body and the attachment bracket excluding the detection unit, a small gap is provided between a window frame constituting a rim of the window portion included in the sensor garnish and the sensor main body, and the window frame includes a noise suppression portion that makes a dimension of the gap uneven in a longitudinal direction and suppresses wind noise due to an airflow passing through in the gap along a rearward direction of the host vehicle.

According to an external sensor attachment portion structure of the present invention, it is possible to suppress wind noise generated in the attachment portion of the external sensor as much as possible.

BRIEF DESCRIPTION OF THE DRAWINGS

FIG. 2B is a front view from the diagonally front side of the host vehicle to which the external sensor is attached.

DETAILED DESCRIPTION OF THE EMBODIMENTS

Figure 1:
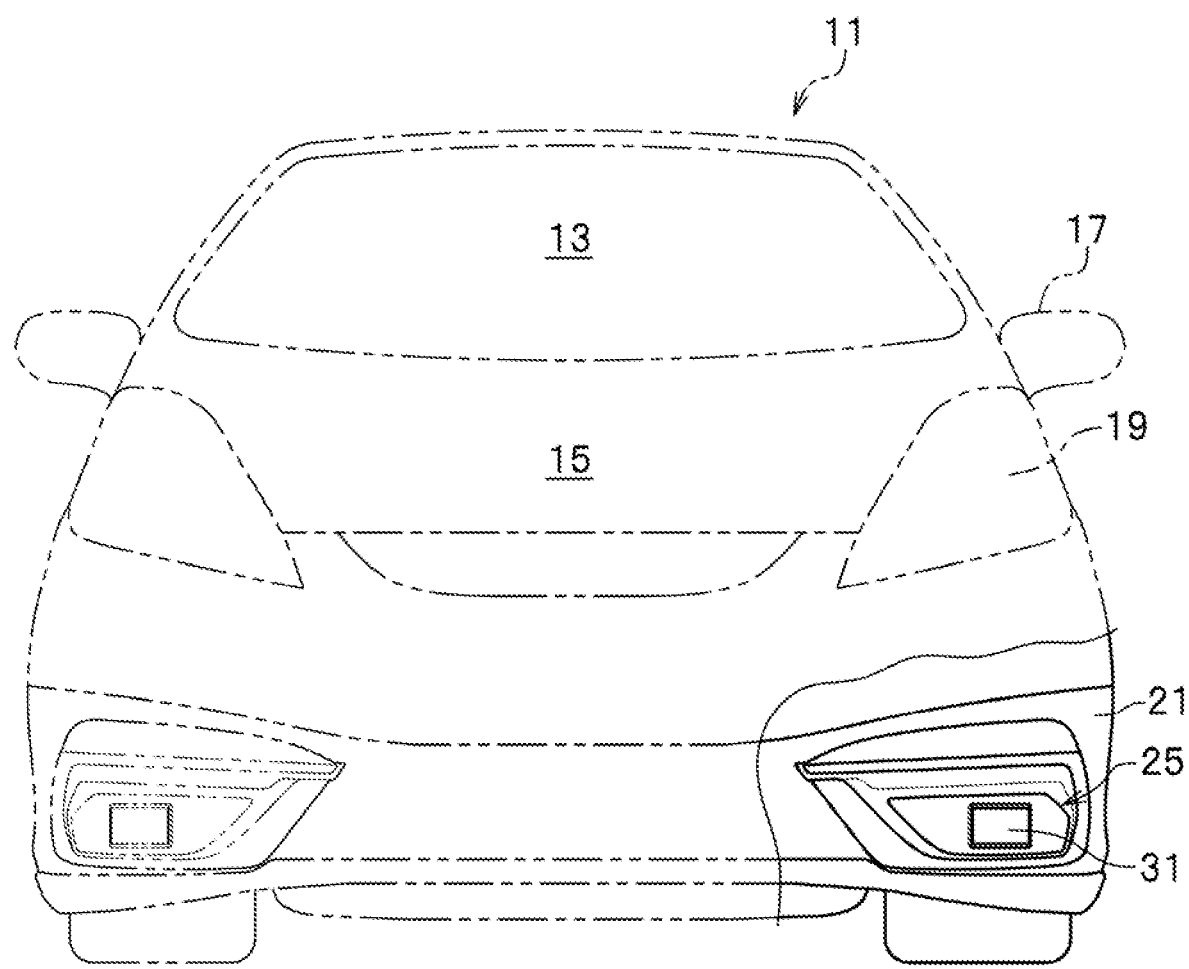
FIG. 1 is an exterior view of a host vehicle to which an external sensor attachment portion structure according to an embodiment of the present invention is applied.
Figure 1:
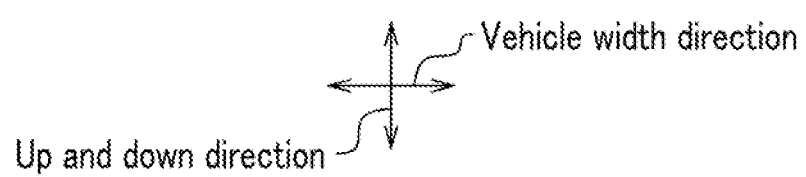

An external sensor attachment portion structure according to embodiments of the present invention will be hereinafter described in detail with reference to the accompanying drawings.

In the drawings below, basically, common reference signs are given to members having common functions or to members having functions corresponding to each other. For the sake of explanatory convenience, the size and the shape of a member may be schematically illustrated with deformation or exaggeration in some cases.

In the following descriptions, the upper and lower direction, the vehicle-width direction, and the front and rear direction each mean a direction based on the state where a host vehicle 11 is placed statically and horizontally.

[Schematic Configuration of Host Vehicle 11 to which External Sensor Attachment Portion Structure According to Embodiment of Present Invention is Applied]

First, a schematic configuration of the host vehicle 11 to which an external sensor attachment portion structure according to this embodiment of the present invention is applied is described with reference to FIGS. 1, 2A, 2B, and 3 as needed.

Figure 2A:
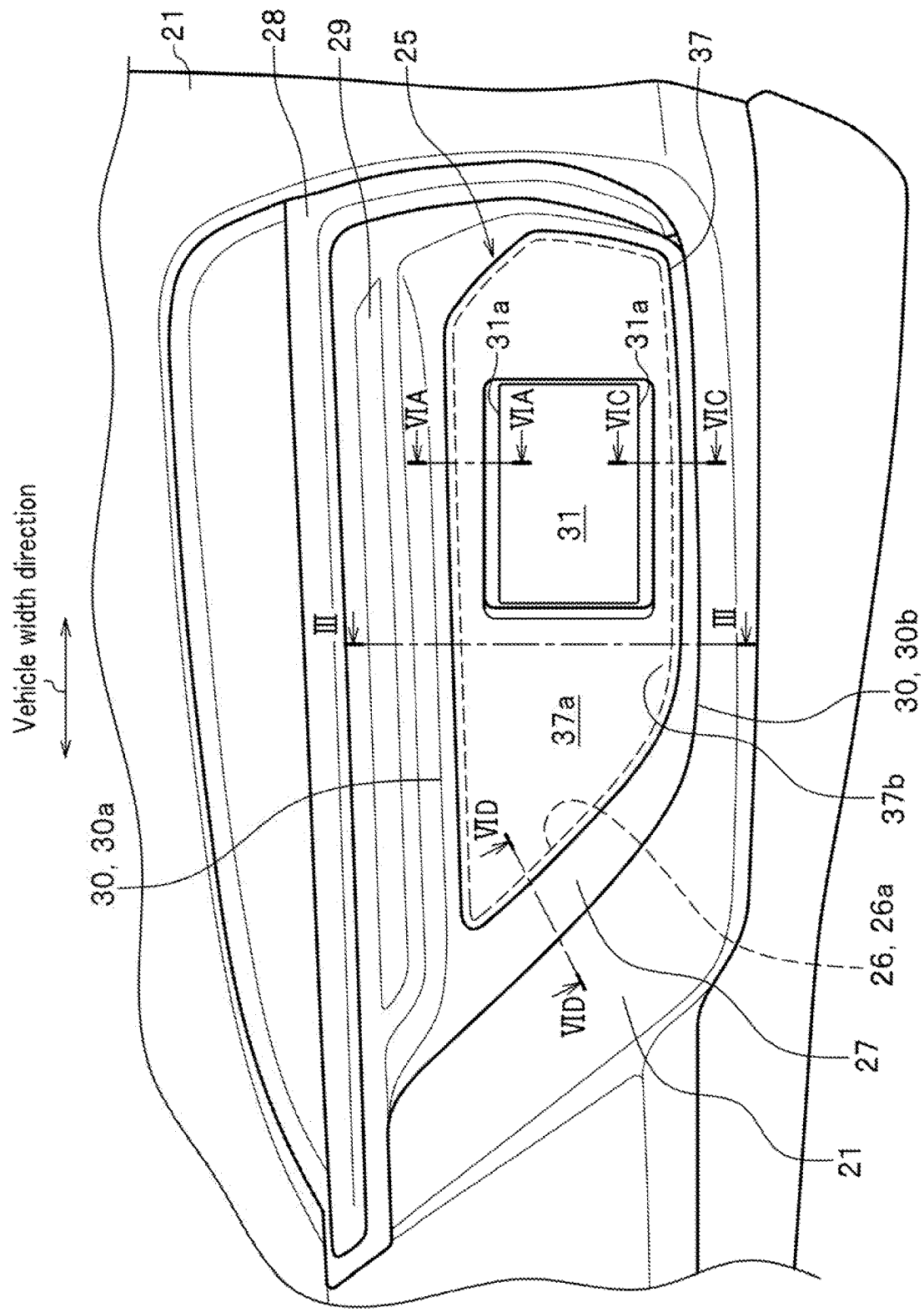
FIG. 2A is a front view of the host vehicle to which an external sensor is attached.
Figure 3:
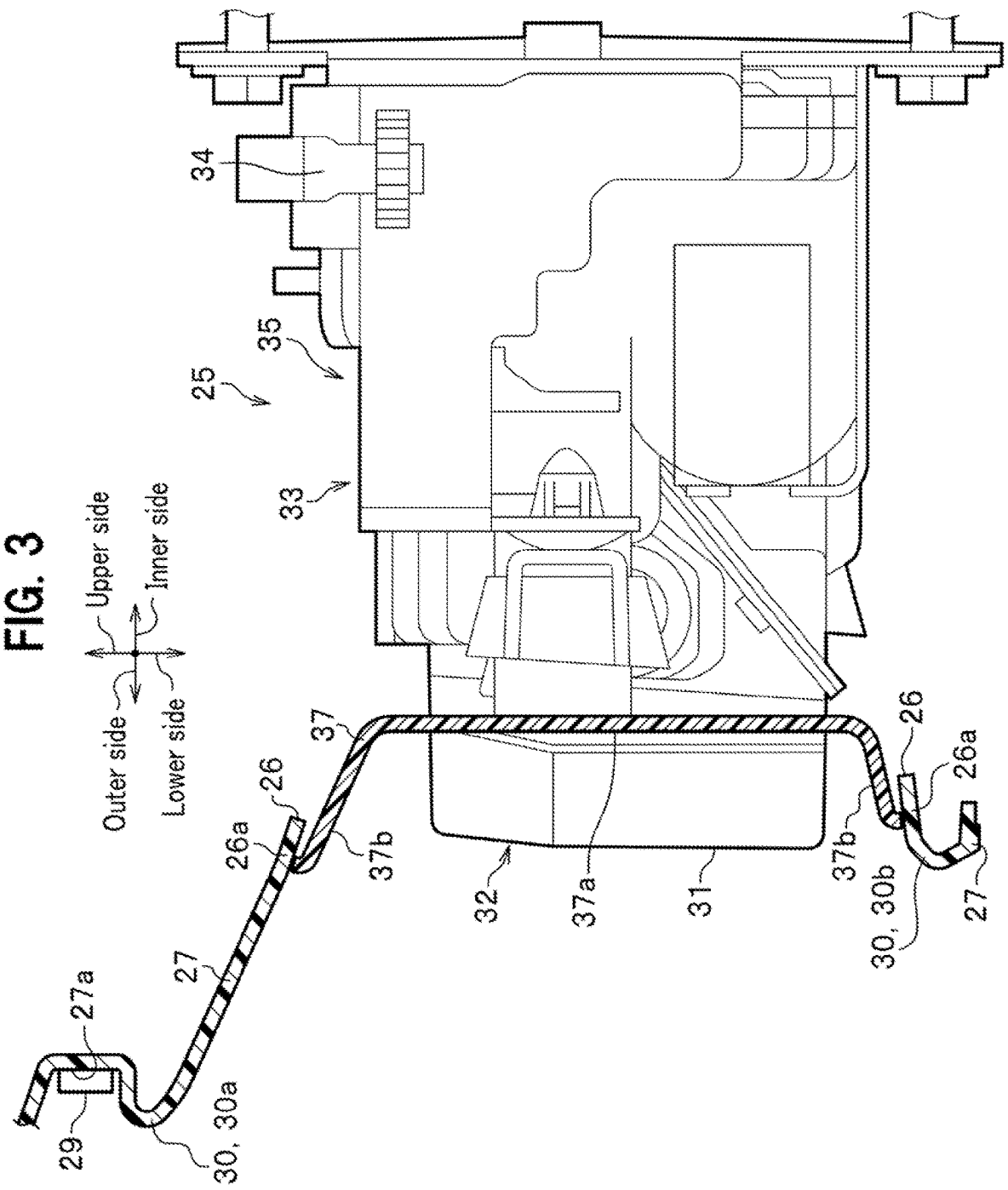
FIG. 3 is a cross-sectional view around the external sensor taken along the line illustrated in FIG. 2A.

FIG. 1 is a schematic configuration view of the host vehicle to which the external sensor attachment portion structure according to this embodiment of the present invention is applied. FIG. 2A is a front view of the host vehicle 11 to which an external sensor 25 is attached. FIG. 2B is a front view from the diagonally front side of the host vehicle 11 to which the external sensor 25 is attached. FIG. 3 is a cross-sectional view around the external sensor 25 taken along the line illustrated in FIG. 2A.

The host vehicle 11 to which the external sensor attachment portion structure according to this embodiment of the present invention is applied is, for example, an electric automobile mounted with a not-illustrated electric motor as a driving source.

As illustrated in FIG. 1, the host vehicle 11 in front view includes a front windshield glass 13, a bonnet hood 15, a side mirror 17, a headlight 19, and a front bumper member 21 for reducing the load in a collision of the host vehicle 11. The front bumper member 21 is attached to a vehicle body frame member 23 (see FIG. 4).

As illustrated in FIG. 1, the front bumper member 21 is provided with the external sensor 25. The external sensor 25 has a function of detecting external information on an object around the host vehicle 11. In order to detect accurately the external information, the external sensor 25 is provided in each of two ends in the vehicle-width direction of the front bumper member 21 included in the host vehicle 11. In appearance, the external sensor 25 seems like being attached to the front bumper member 21. However, actually, the external sensor 25 is attached to the vehicle body frame member 23 as with the front bumper member 21. This configuration will be described in detail later.

As illustrated in FIGS. 2A and 2B, a large window portion 26 is provided in the front bumper member 21 such that a sensor main body 33 (described in detail later) of the external sensor 25 is to be inserted through the large window portion 26 when the external sensor 25 is attached to the vehicle body frame member 23. Actually, the large window portion 26 is provided in a light garnish 27 separated from the front bumper member 21. However, the light garnish 27 is attached to the front bumper member 21. For this reason, in this embodiment of the present invention, the light garnish 27 is treated as a member constituting a part of the front bumper member 21.

The light garnish 27 includes a plating molding portion 28. As illustrated in FIGS. 2A and 2B, the plating molding portion 28 is positioned so as to surround the external sensor 25 in the substantially L shape.

The plating molding portion 28 is attached to the light garnish 27. For this reason, in the present invention, the plating molding portion 28 is treated as a member constituting a part of the front bumper member 21 as with the light garnish 27.

As illustrated in FIGS. 2A, 2B, and 3, the light garnish 27 constituting a part of the front bumper member 21 includes first and second eave-shaped projecting portions 30a and 30b that are positioned so as to project in the form of eave toward the outer side of the host vehicle 11 (see FIG. 4) from a general surface 37a of a sensor garnish 37 constituting a part of the external sensor 25 (described in detail later). The first and second eave-shaped projecting portions 30a and 30b may be collectively called an "eave-shaped projecting portion 30".

As illustrated in FIG. 3, the first eave-shaped projecting portion 30a is positioned above the sensor garnish 37. On the other hand, the second eave-shaped projecting portion 30b is positioned on the lower side of the sensor garnish 37. The first eave-shaped projecting portion 30a is formed in the light garnish 27 so as to project toward the outer side of the host vehicle 11 more than the second eave-shaped projecting portion 30b does.

As illustrated in FIG. 2A, the extending direction of a side 31a extending in the substantially horizontal direction in the detection surface 31 for detecting the external information included in the external sensor 25 is similar to the extending direction of the eave-shaped projecting portion 30. As illustrated in FIGS. 1 and 2A, the eave-shaped projecting portion 30 is provided on the end portion side in the vehicle-width direction of the host vehicle 11.

As illustrated in FIG. 3, the light garnish 27 is provided with a horizontal recess portion 27a that continues to the eave-shaped projecting portion 30 and is recessed toward the inner side of the host vehicle 11 along the substantially horizontal direction. In this horizontal recess portion 27a, an accessory light (lamp) 29 extending along the substantially horizontal direction is embedded.

Here is the reason why the accessory light 29 is provided. Specifically, an automated driving vehicle to which the present invention is expected to be applied executes an autonomous traveling control including steering and accelerating and decelerating based on the external information and the like detected by the external sensor 25. Such an automated driving vehicle can operate in a hands-free driving mode, which allows the hands-free driving in which the steering by driver is not needed. The automated driving vehicle in the hands-free driving mode can operate safely by the hands-free driving.

However, during the transition period in which conventional vehicles, which need the steering by driver, and the automated driving vehicles are traveling together, it is difficult for managers and supervisors in charge of the safe operation management of vehicles (e.g., police officers) to determine whether the hands-free driving vehicle is a conventional vehicle or an automated driving vehicle and to place a proper regulation.

The accessory light 29 is then applied to deal with the above problem. For example, the automated driving vehicle operates by a rule (that is merely an example) that the accessory light 29 is used to light up a green lamp when the automated driving vehicle is in the hands-free driving mode. This operation makes it possible to visually check the lighting state of the accessory light 29 of the hands-free driving vehicle and to determine immediately whether the hands-free driving is justifiable.

As illustrated in FIG. 3, the accessory light 29 is provided on the upper side of the detection surface 31 of the external sensor 25 with the first eave-shaped projecting portion 30a included in the light garnish 27 being provided between the accessory light 29 and the detection surface 31 of the external sensor 25. With this configuration, for example, when a third person visually checks the host vehicle 11 from the outer side with the accessory light 29 being lighted up, the detection surface 31 of the external sensor 25 seems relatively dark (dazzling effect).

Consequently, there can also be expected an effect that the dazzling effect of the accessory light 29 can obscure the external sensor 25, which is demanded to be hidden as much as possible in terms of avoiding mischief.

[External Sensor Attachment Portion Structure According to Embodiment of Present Invention]

Next, the external sensor attachment portion structure according to this embodiment of the present invention is described with reference to FIGS. 4, 5, 6A to 6F, 7A, and 7B as needed.

Figure 4:
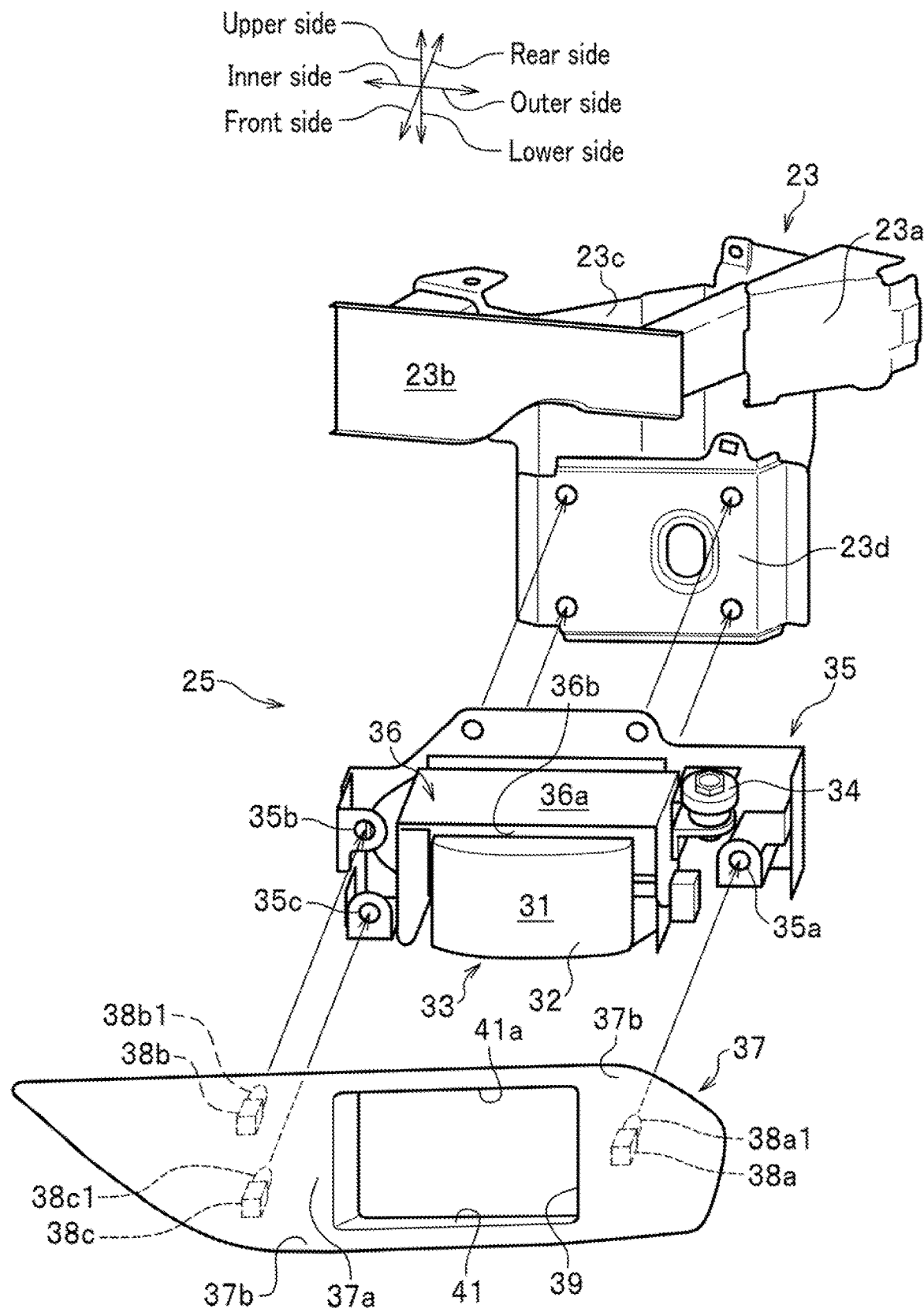
FIG. 4 is an exploded perspective view from the diagonally above on the front side of the external sensor illustrating the external sensor attachment portion structure according to the embodiment of the present invention.
Figure 5:
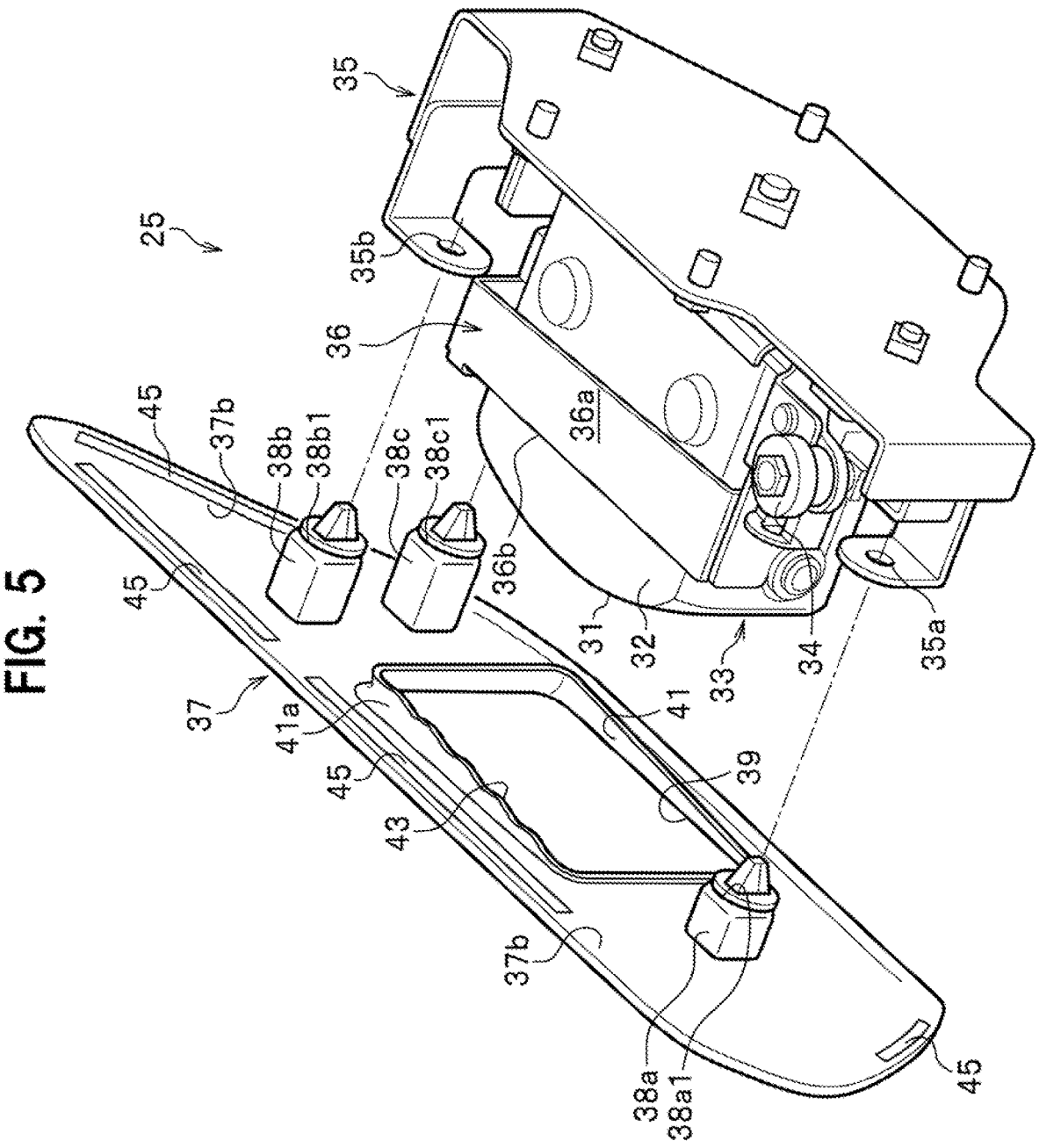
FIG. 5 is an exploded perspective view from the diagonally above on the rear side of the external sensor.
Figure 6A:
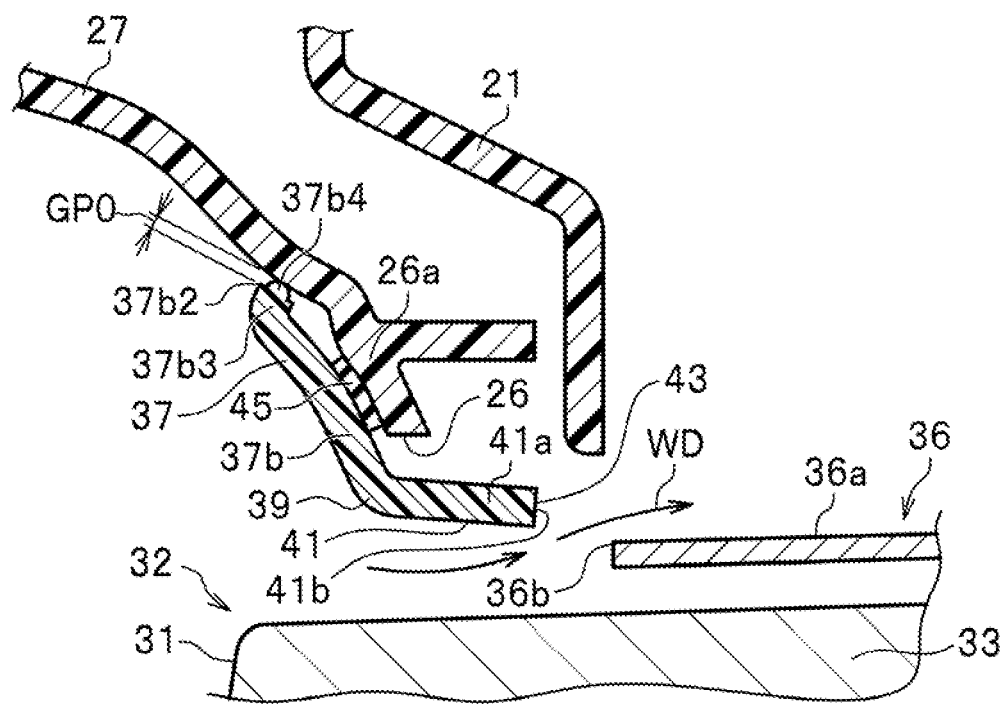
FIG. 6A is a cross-sectional view of the external sensor taken along the VIA-VIA line illustrated in FIG. 2A.
Figure 6B:
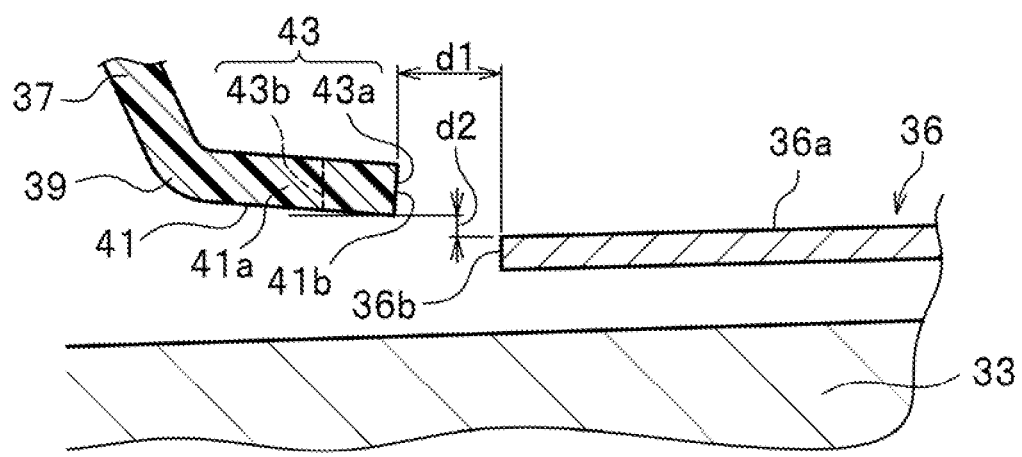
FIG. 6B is an enlarged explanatory view illustrating a principal part of the external sensor illustrated in FIG. 6A.
Figure 6C:
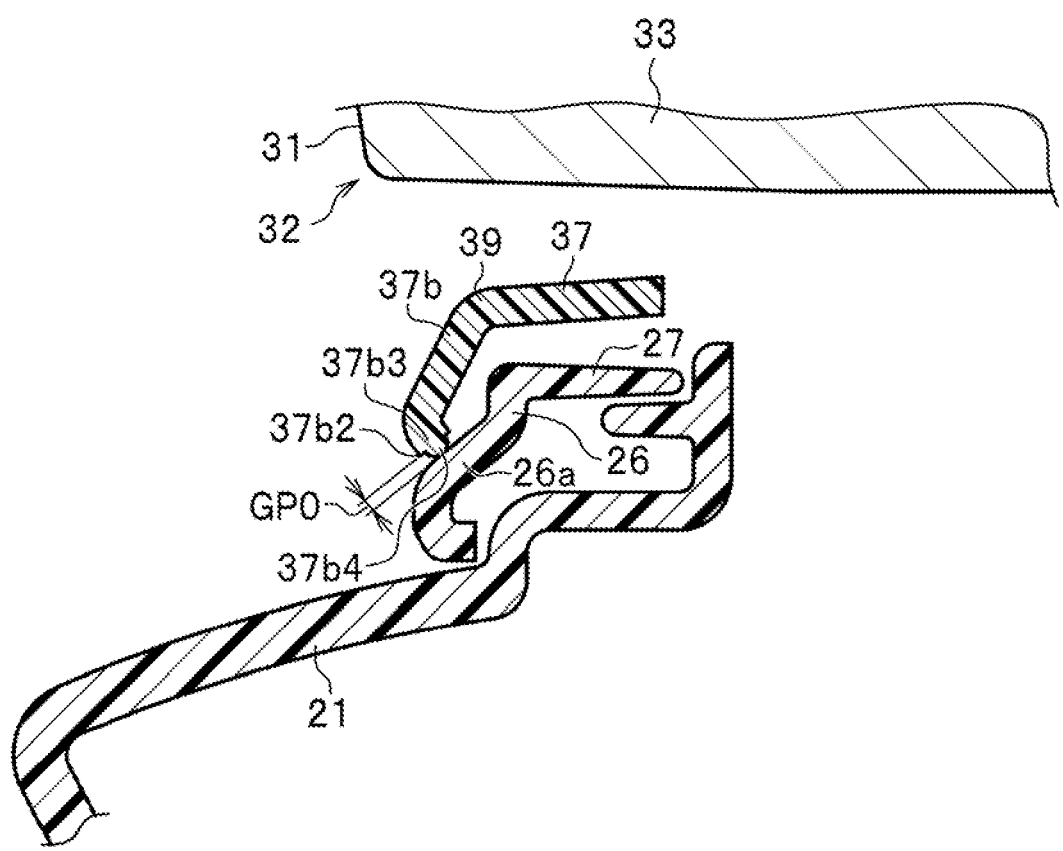
FIG. 6C is a cross-sectional view of the external sensor taken along the VIC-VIC line illustrated in FIG. 2A.
Figure 6D:
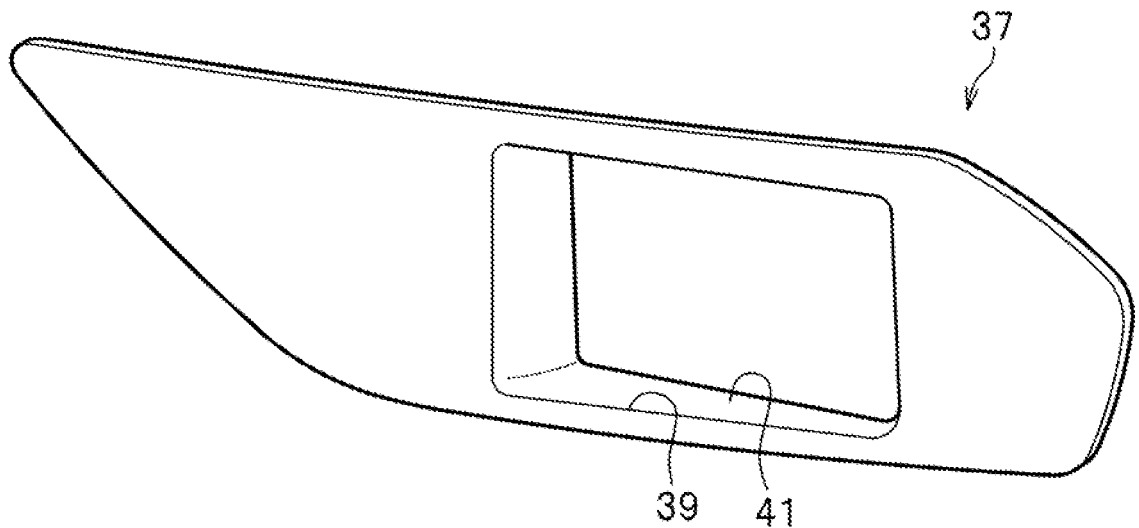
FIG. 6D is a perspective view from the diagonally above on the front side of a sensor garnish.
Figure 6E:
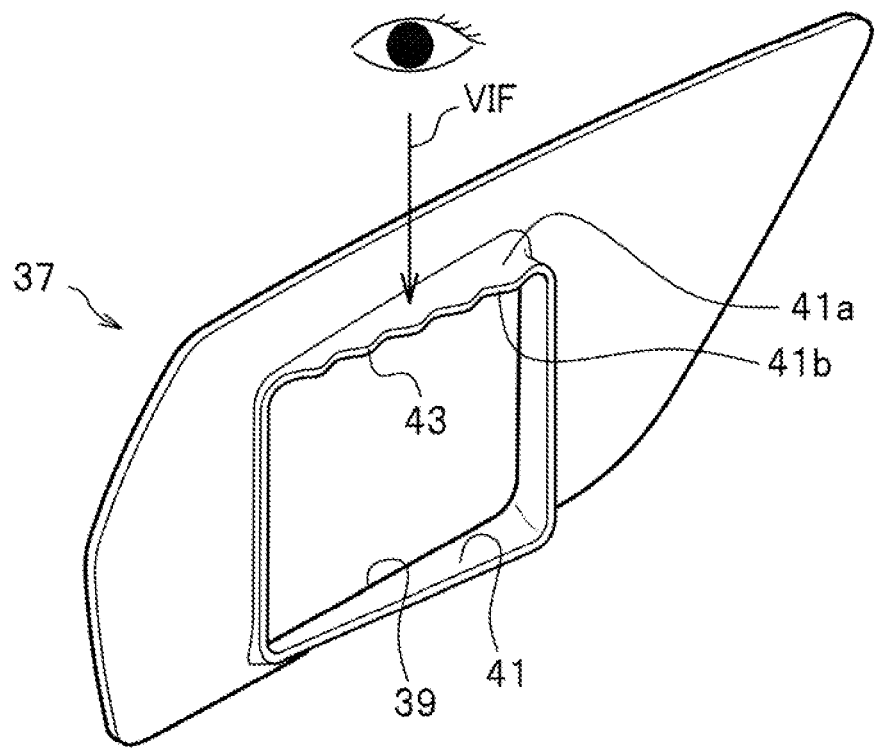
FIG. 6E is a perspective view from the diagonally above on the rear side of the sensor garnish.
Figure 6F:
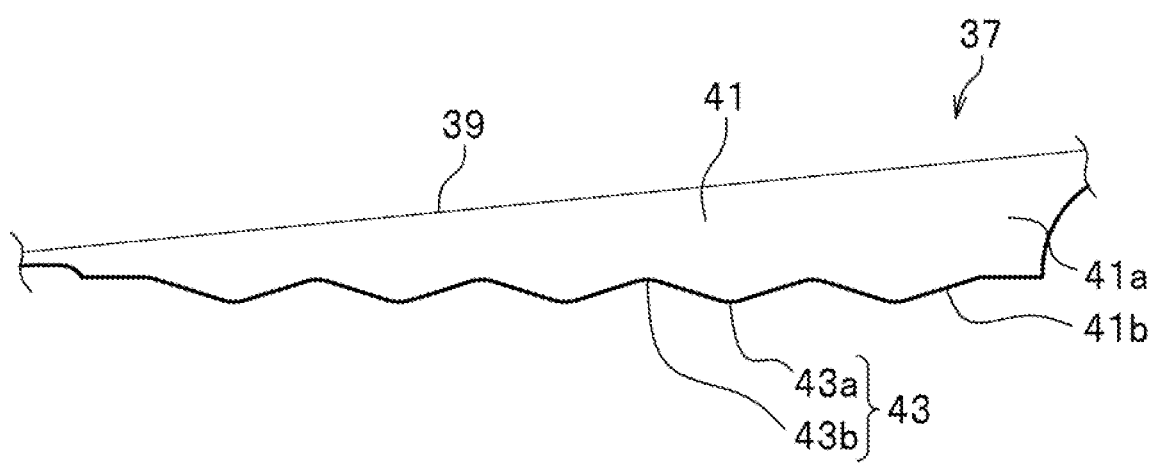
FIG. 6F is an enlarged explanatory view of a noise suppression portion formed on an extension end of a jutting wall portion of the sensor garnish viewed in a direction indicated by the arrow VIF in FIG. 6E.

FIG. 4 is an exploded perspective view from the diagonally above on the front side of the external sensor 25 illustrating the external sensor attachment portion structure according to this embodiment of the present invention. FIG. 5 is an exploded perspective view from the diagonally above on the rear side of the external sensor 25. FIG. 6A is a cross-sectional view of the external sensor 25 taken along the VIA-VIA line illustrated in FIG. 2A. FIG. 6B is an enlarged explanatory view illustrating a principal part of the external sensor 25 illustrated in FIG. 6A. FIG. 6C is a cross-sectional view of the external sensor 25 taken along the VIC-VIC line. FIG. 6D is a perspective view from the diagonally above on the front side of the sensor garnish 37. FIG. 6E is a perspective view from the diagonally above on the rear side of the sensor garnish 37. FIG. 6F is an enlarged explanatory view of a wavy noise suppression portion 43 formed on an extension end 37e of a jutting wall portion 37c of the sensor garnish 37 viewed in a direction indicated by the arrow VIF in FIG. 6E.

Figure 7A:
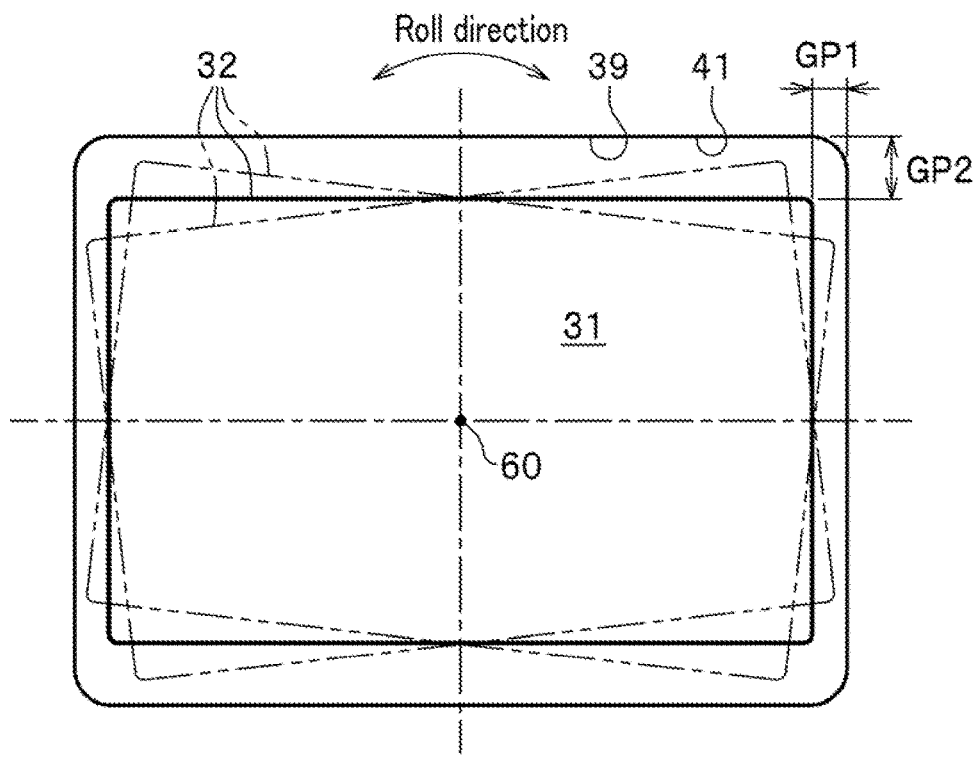
FIG. 7A is an explanatory view illustrating a comparison between the sizes of gaps between a window portion of the sensor garnish and a detection unit of the external sensor in the vehicle-width direction and the upper and lower direction in front view, and illustrating an adjustment margin in the roll direction of the detection unit of the external sensor.
Figure 7B:
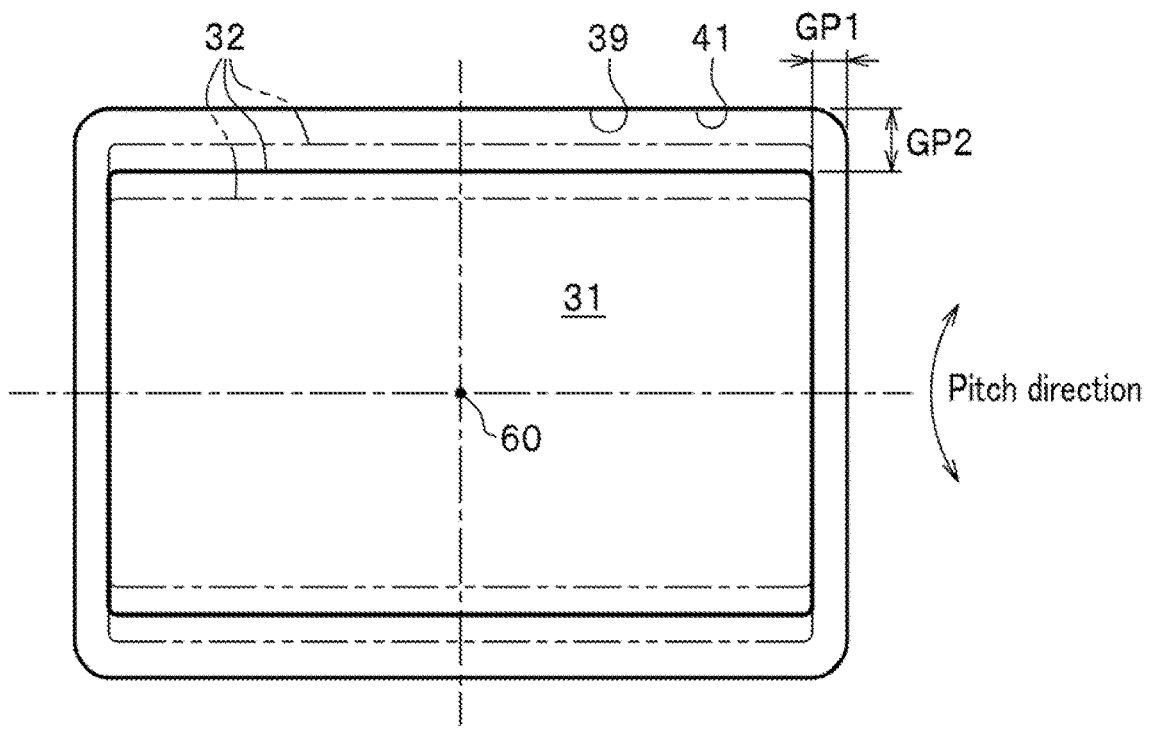
FIG. 7B is an explanatory view illustrating a comparison between the sizes of the gaps between the window portion of the sensor garnish and the detection unit of the external sensor in the vehicle-width direction and the upper and lower direction in front view, and illustrating an adjustment margin in the pitch direction of the detection unit of the external sensor.

FIG. 7A is an explanatory view illustrating a comparison between the sizes of gaps between a window portion 39 of the sensor garnish 37 and a detection unit 32 of the external sensor 25 in the vehicle-width direction and the upper and lower direction in front view, and illustrating an adjustment margin in the roll direction of the detection unit 32 of the external sensor 25. FIG. 7B is an explanatory view illustrating a comparison between the sizes of gaps between the window portion 39 of the sensor garnish 37 and the detection unit 32 of the external sensor 25 in the vehicle-width direction and the upper and lower direction in front view, and illustrating an adjustment margin in the pitch direction of the detection unit 32 of the external sensor 25.

As illustrated in FIGS. 4 and 5, the external sensor 25 includes the sensor main body 33 including the detection surface 31 for detecting the external information that is substantially rectangular in front view, a sensor attachment bracket 35, and the sensor garnish 37. As illustrated in FIGS. 4 and 5, the detection surface 31 is formed in a curved shape to have a wide detection region of the external information in the vehicle-width direction, the curved shape including a center portion in the vehicle-width direction protruding the most toward the outer side of the host vehicle 11 and end portions in the vehicle-width direction retracting gradually toward the inner side of the host vehicle 11.

The external sensor 25 may be formed of, for example, a laser radar, a millimeter wave radar, an ultrasonic wave sensor, an optical camera, or the like. In this embodiment, a laser radar is adopted as the external sensor 25.

The "detection surface" in the case of adopting a laser radar, a millimeter wave radar, or an ultrasonic wave sensor means a transmission and reception surface of an external detection wave. On the other hand, in the case of adopting an optical camera, a lens surface of a field lens corresponds to the "detection surface". A unit related to the detection and including the detection surface 31 is called the detection unit 32.

The sensor attachment bracket 35 is a member to be used when the sensor main body 33 and the sensor garnish 37 are attached to the vehicle body frame member 23 (see FIG. 4: corresponding to the "vehicle body structure" of the present invention). The sensor attachment bracket 35 corresponds to a part of the "attachment bracket" and the "main bracket" of the present invention.

A holding bracket 36 that holds the sensor main body 33 is attached to the sensor attachment bracket 35 by a position adjustment mechanism 34 (see FIG. 4) such that the relative position of the sensor main body 33 with respect to the sensor attachment bracket 35 can be adjusted. The position adjustment mechanism 34 has a position adjustment function to adjust the orientation of the sensor main body 33 in the roll direction and the pitch direction. The sensor main body 33 is held by the holding bracket 36. The holding bracket 36 corresponds to a part of the "attachment bracket" of the present invention.

In short, while being held by the holding bracket 36, the sensor main body 33 is attached to the vehicle body frame member 23 so that the position adjustment of the orientation of the sensor main body 33 in the roll direction and the pitch direction can be performed using the position adjustment mechanism 34 and the sensor attachment bracket 35.

On the other hand, the sensor garnish 37 is attached and fixed (incapable of adjusting position) to the vehicle body frame member 23 using the sensor attachment bracket 35. This configuration will be described in detail later.

In order to attach the sensor garnish 37 to the sensor attachment bracket 35, circular first to third engagement holes 35a, 35b, and 35c are formed in the sensor attachment bracket 35 as illustrated in FIGS. 4 and 5.

The vehicle body frame member 23 is described with reference to FIG. 4. As illustrated in FIG. 4, the vehicle body frame member 23 includes a front side member 23a extending in the front and rear direction of the host vehicle 11, a front cross member 23b extending in the vehicle-width direction of the host vehicle 11, a reinforcement member 23c in the form of a beam bridged the front side member 23a and front cross member 23b at a connecting portion therebetween, and an attachment portion 23d for the sensor main body 33 provided in the reinforcement member 23c.

As illustrated in FIGS. 4 and 5, the sensor main body 33 is attached to the sensor attachment bracket 35 by the position adjustment mechanism 34 linked to a roll angle and a pitch angle of the host vehicle 11. On the other hand, the sensor garnish 37 is attached directly to the first to third engagement holes 35a, 35b, and 35c of the sensor attachment bracket 35 without using the position adjustment mechanism 34.

As illustrated in FIG. 4, the sensor attachment bracket 35 is attached to the above-described attachment portion 23d of the vehicle body frame member 23 with an appropriate fastening unit such as screws. With this configuration, the sensor main body 33 is formed so that the position adjustment of the external sensor 25 in the roll direction and the pitch direction of the host vehicle 11 can be performed at a center point 60 (see FIGS. 7A and 7B) of the sensor main body 33 using the position adjustment mechanism 34 while the sensor attachment bracket 35 is attached to the vehicle body frame member 23.

As illustrated in FIGS. 4, 5, and 6D, the sensor garnish 37 includes the substantially rectangular window portion 39 that allows the detection surface 31 of the sensor main body 33 to be exposed in front view. The window portion 39 is formed smaller than the large window portion 26. As illustrated in FIG. 3, the sensor garnish 37 is formed in a substantially plate shape such that a rim portion 37b expands and projects toward the outer side of the host vehicle 11 from the general surface 37a in front view.

The sensor garnish 37 serves to hide (cover up) the portions of the external sensor 25 except the detection surface 31 (at least including the sensor main body 33 and the sensor attachment bracket 35) and the rim portion 26a of the large window portion 26 provided in the light garnish 27 from the outer side of the host vehicle 11. The sensor garnish 37 may be, for example, formed integrally using a synthetic resin.

It is also possible to adopt a configuration in which the sensor garnish 37 is formed of separated multiple members, and the sensor garnish 37 is obtained by assembling those multiple members.

As illustrated in FIGS. 4 5, 6D to 6F, 7A, and 7B, in the window portion 39 provided in the sensor garnish, a substantially rectangular window frame 41 constituting the rim of the window portion 39 is formed. As illustrated in FIGS. 5 and 6E, at least a part of the window frame 41 includes a jutting wall portion 41a extending in the rearward direction of the host vehicle 11. Small gaps GP1 and GP2 (see FIGS. 7A and 7B) are provided between the jutting wall portion 41a included in the window frame 41 and the sensor main body 33.

As illustrated in FIGS. 5, 6A, 6B, 6E, and 6F, the jutting wall portion 41a included in the window frame 41 includes a noise suppression portion 43 that suppresses the wind noise due to an airflow WD (see FIG. 6A) passing through the above-described gaps GP1 and GP2 along the rearward direction of the host vehicle 11.

The noise suppression portion 43 is formed of an extension end 41b of the jutting wall portion 41a zigzagged in the waveform in the back and forth direction of the host vehicle 11 while extending in the longitudinal direction. As illustrated in FIGS. 6B, 6E, and 6F, the waves of the noise suppression portion 43 are formed by providing projection portions 43a and recess portions 43b alternately.

As illustrated in FIGS. 4, 5, 6A, and 6B, the holding bracket 36 constituting a part of the sensor attachment bracket 35 includes a plate-shaped support frame portion 36a positioned to surround at least a part of the sensor main body 33. The support frame portion 36a is provided at least above the sensor main body 33 in the vertical direction.

The support frame portion 36a constituting a part of the holding bracket 36 and the jutting wall portion 41a included in the window frame 41 are provided to extend in the substantially horizontal direction. As illustrated in FIGS. 6A and 6B, the noise suppression portion 43 formed of the extension end 41b of the jutting wall portion 41a is provided in a portion of the window frame 41 positioned at range in which a first distance d1 (see FIG. 6B) from the support frame portion 36a is a predetermined or shorter distance.

To be specific, as illustrated in FIG. 6B, the extension end 41b of the jutting wall portion 41a in the rearward direction and a support frame end 36b of the support frame portion 36a in the frontward direction of the host vehicle 11 are distanced from each other by the first distance d1 in the back and forth direction of the host vehicle 11 and displaced from each other by a second distance d2 in the vertical direction.

In the case where the extension end 41b of the jutting wall portion 41a and the support frame end 36b of the support frame portion 36a are away from each other by the first distance d1 (see FIG. 6B) within a predetermined distance from the support frame portion 36a in the back and forth direction of the host vehicle 11, the narrowed gaps GP1 and GP2 cause an increase in the speed of the airflow WD passing through the gaps GP1 and GP2 along the rearward direction of the host vehicle 11, and thus the wind noise is likely to be amplified.

In the case where the extension end 41b of the jutting wall portion 41a and the support frame end 36b of the support frame portion 36a are positioned at substantially the same height in the vertical direction so as to interfere with each other, the above-described airflow WD (see FIG. 6A) causes a large lump of air vortex generated near the extension end 41b to collide and interfere with the support frame end 36b, and thus the wind noise is likely to be amplified.

In contrast, in the case where the extension end 41b of the jutting wall portion 41a and the support frame end 36b of the support frame portion 36a are displaced from each other by the second distance d2 in the vertical direction, the wind noise is likely to be suppressed more than in the above-described case of being positioned at substantially the same height.

Thus, according to the external sensor attachment portion structure of this embodiment of the present invention, since the noise suppression portion 43 is provided in the jutting wall portion 41a included in the window frame 41 in the case where the extension end 41b of the jutting wall portion 41a and the support frame end 36b of the support frame portion 36a are displaced from each other by the second distance d2 in the vertical direction, the air vortex generated near the extension end 41b due to the airflow WD (see FIG. 6A) is divided into small lumps by the turbulence effect of the noise suppression portion 43, and thus the effect of suppressing the wind noise can be expected.

As illustrated in FIGS. 4 and 5, three first to third support leg portions 38a, 38b, and 38c made of a synthetic resin are provided on the back surface side of the sensor garnish 37. The first support leg portion 38a is provided on the outer side in the vehicle-width direction of the sensor garnish 37. Meanwhile, the second and third support leg portions 38b and 38c are provided on the inner side in the vehicle-width direction of the sensor garnish 37 across the window portion 39 from the first support leg portion 38a.

As illustrated in FIGS. 4 and 5, first to third engagement portions 38a1, 38b1, and 38c1 are provided on the tip end side of the first to third support leg portions 38a, 38b, and 38c, respectively.

As illustrated in FIGS. 4 and 5, the first to third engagement portions 38a1, 38b1, and 38c1 formed as clips provided on the back surface side of the sensor garnish 37 are, in the axial direction, inserted to and engaged with the first to third engagement holes 35a, 35b, and 35c formed in the sensor attachment bracket 35. With this configuration, the sensor garnish 37 is attached removably to the sensor attachment bracket 35.

For example, as illustrated in FIG. 5, a seal member 45 is adhered on the back surface side in the rim portion 37b of the sensor garnish 37. The function of the seal member 45 will be described in detail later.

In the external sensor attachment portion structure according to this embodiment of the present invention, the front bumper member is attached to the vehicle body frame member 23 by a not-illustrated attachment bracket. As illustrated in FIGS. 4 and 5, the sensor main body 33 and the sensor garnish 37 are attached to the vehicle body frame member 23 by the sensor attachment bracket 35 with the sensor main body 33 and the sensor garnish 37 being separated and independent from the front bumper member 21.

In short, the front bumper member 21 and the sensor main body 33 and the sensor garnish 37 are attached to the vehicle body frame member 23 while being separated and independent from each other.

In the external sensor attachment portion structure according to this embodiment of the present invention, when the sensor main body 33 and the sensor garnish 37 are attached to the vehicle body frame member 23, the rim portion 26a of the large window portion 26 opened in the light garnish 27 and the rim portion 37b of the sensor garnish 37 are, as illustrated in FIG. 3, arranged to face each other with a small gap formed therebetween (see a gap GP0 in FIGS. 6A and 6C) while being inclined at similar angles such that the combined diameter of the rim portion 26a and the rim portion 37b becomes smaller from the outer side toward the inner side of the host vehicle 11. The small gap GP0 will be described in detail later.

With the sensor main body 33 and the sensor garnish 37 being attached to the vehicle body frame member 23, the detection surface 31 included in the sensor main body 33 is exposed to the outer side of the host vehicle 11 through the window portion 39 provided in the sensor garnish 37 (see FIGS. 2A, 2B, and the like).

With the sensor main body 33 and the sensor garnish 37 being attached to the vehicle body frame member 23, the small gap GP0 is provided between the rim portion 26a of the large window portion 26 provided in the light garnish 27 and an end rim portion 37b2 of the rim portion 37b of the sensor garnish 37. As illustrated in FIGS. 6A and 6C, a bend portion 37b3 is provided in the end rim portion 37b2 of the sensor garnish 37 to bend toward the facing rim portion 26a of the large window portion 26.

As illustrated in FIGS. 6A and 6C, a contact portion 37b4 having a semicircular cross-section is provided at an open end portion of the bend portion 37b3. The contact portion 37b4 is put in contact with the facing rim portion 26a of the large window portion 26. Since the contact portion 37b4 facing the rim portion 26a of the large window portion 26 is formed to have a semicircular cross-section with rounded corners as described above, it is possible to prevent flaws on the rim portion 26a of the large window portion 26.

Note that, as described above, with the sensor main body 33 and the sensor garnish 37 being attached to the vehicle body frame member 23, the end rim portion 37b2 of the rim portion 37b of the sensor garnish 37 is positioned to face the rim portion 26a of the large window portion 26 provided in the light garnish 27 with the small gap GP0 being formed therebetween as illustrated in FIGS. 6A and 6C.

Additionally, with the sensor main body 33 and the sensor garnish 37 being attached to the vehicle body frame member 23, as illustrated in FIG. 6A, the seal member 45 is provided in a portion that is different from the above-described small gap GP0 but is between the rim portion 26a of the large window portion 26 provided in the light garnish 27 and the rim portion 37b of the sensor garnish 37.

With the above-described small gap GP0 being remained, the seal member 45 prevents the end rim portion 37b2 of the sensor garnish 37 from rubbing on the facing rim portion 26a of the large window portion 26, and thereby serving to prevent flaws on the rim portion 26a of the large window portion 26 provided in the light garnish 27.

Moreover, with the sensor main body 33 and the sensor garnish 37 being attached to the vehicle body frame member 23, since the end rim portion 37b2 of the rim portion 37b of the sensor garnish 37 is positioned to face the rim portion 26a of the large window portion 26 provided in the light garnish 27 with the small gap GP0 formed therebetween as illustrated in FIGS. 6A and 6C, it is possible to reliably prevent flaws generated by a contact of an edge portion of the end rim portion 37b2 with the rim portion 26a of the large window portion 26.

With the sensor main body 33 and the sensor garnish 37 being attached to the vehicle body frame member 23, in front view, the length dimensions of a longitudinal side and a lateral side of the rectangular window portion 39 of the sensor garnish 37 are set longer than the length dimensions of a longitudinal side and a lateral side of the rectangular detection unit 32 included in the sensor main body 33, respectively.

Specifically, as illustrated in FIGS. 7A and 7B, the horizontal gap GP1 generated between the longitudinal side of the window portion 39 and the longitudinal side of the detection unit 32 is set longer than the vertical gap GP2 generated between the lateral side of the window portion 39 and the lateral side of the detection unit 32.

With this configuration, as illustrated in FIG. 7A, with the sensor attachment bracket 35 being attached to the vehicle body frame member 23, it is possible to adjust the position of the sensor main body 33 with respect to the sensor attachment bracket 35 in the roll direction of the host vehicle 11 about the center point 60 of the sensor main body 33, by using the position adjustment mechanism 34 with the entire detection surface 31 of the detection unit 32 being exposed to the outer side of the host vehicle 11 through the window portion 39.

As illustrated in FIG. 7B, with the sensor attachment bracket 35 being attached to the vehicle body frame member 23, it is possible to adjust the position of the sensor main body 33 with respect to the sensor attachment bracket 35 in the pitch direction of the host vehicle 11 about a horizontal axis through the center point 60 of the sensor main body 33, by using the position adjustment mechanism 34 with the entire detection surface 31 of the detection unit 32 being exposed to the outer side of the host vehicle 11 through the window portion 39.

The positioning adjustment in the roll direction and the pitch direction of the sensor main body 33 is performed with the sensor garnish 37 being removed from the sensor attachment bracket 35.

[Operations and Effects of External Sensor Attachment Portion Structure According to Embodiment of Present Invention]

Next, the operations and effects of the external sensor attachment portion structure according to this embodiment of the present invention are described.

The external sensor attachment portion structure based on the first aspect is an external sensor attachment portion structure that is used to attach the external sensor 25 that detects external information on an object around the host vehicle 11 to the host vehicle 11, in which the external sensor 25 includes the sensor main body 33 including the detection unit 32 that detects the external information, the attachment bracket 35 used to attach the sensor main body 33 to the vehicle body frame member (vehicle body structure) 23, and the sensor garnish 37 including the window portion 39 through which the detection unit 32 is exposed in front view.

The sensor garnish 37 is provided on the outer side of the host vehicle 11 so as to expose the detection unit 32 of the external sensor 25 and cover at least the sensor main body 33 and the attachment bracket 35 excluding the detection unit 32, the small gaps GP1 and GP2 (see FIGS. 7A and 7B) are provided between the window frame 41 constituting the rim of the window portion 39 included in the sensor garnish 37 and the sensor main body 33, and the window frame 41 includes the noise suppression portion 43 that makes the dimension of at least one of the above-described gaps GP1 and GP2 uneven in the longitudinal direction and suppresses the wind noise due to the airflow WD (see FIG. 6A) passing through the gaps GP1 and GP2 along the rearward direction of the host vehicle 11.

In the external sensor attachment portion structure based on the first aspect, the small gaps GP1 and GP2 are provided between the window frame 41 and the sensor main body 33, and the noise suppression portion 43 that makes the dimension of at least one of the above-described gaps GP1 and GP2 uneven in the longitudinal direction and suppresses the wind noise due to the airflow WD passing through the gaps GP1 and GP2 along the rearward direction of the host vehicle 11 is provided in the window frame 41.

According to the external sensor attachment portion structure based on the first aspect, even if an airflow is generated in the gaps GP1 and GP2 while the host vehicle 11 is traveling, the air vortex generated near the window frame 41 is divided into small lumps by the turbulence effect of the noise suppression portion 43, and thus the wind noise generated in the attachment portion of the external sensor 25 can be suppressed as much as possible.

As the external sensor attachment portion structure based on a second aspect, a structure that is the external sensor attachment portion structure based on the first aspect may be adopted in which the window frame 41 is formed in a substantially rectangular shape, at least a part of the window frame 41 includes the jutting wall portion 41a extending in the rearward direction of the host vehicle 11, and the noise suppression portion 43 is formed of the extension end 41b of the jutting wall portion 41a zigzagged in a waveform in the back and forth direction of the host vehicle 11 while extending in the longitudinal direction.

According to the external sensor attachment portion structure based on the second aspect, since the noise suppression portion 43 is formed of the extension end 41b of the jutting wall portion 41a zigzagged in the waveform in the back and forth direction of the host vehicle 11 while extending in the longitudinal direction, it is possible to properly suppress the wind noise generated in the attachment portion of the external sensor 25 by enhancing the turbulence effect of the noise suppression portion 43 to further facilitate the dividing of the air vortex, in addition to the operations and effects of the external sensor attachment portion structure based on the first aspect.

As the external sensor attachment portion structure based on a third aspect, a structure that is the external sensor attachment portion structure based on the first or second aspect may be adopted in which the attachment bracket 35 (holding bracket 36) includes the plate-shaped support frame portion 36a positioned to surround at least apart of the sensor main body 33, and the noise suppression portion 43 is provided in a portion of the window frame 41 positioned at range in which the distance (first distance d1: see FIG. 6B) from the support frame portion 36a is within a predetermined distance.

In the external sensor attachment portion structure based on the third aspect, the noise suppression portion 43 is provided in a portion of the window frame 41 positioned at range in which the distance (first distance d1) from the support frame portion 36a is within a predetermined distance. The gaps GP1 and GP2 thus narrowed cause an increase in the speed of the airflow WD passing through the gaps GP1 and GP2 along the rearward direction of the host vehicle 11, and thus the wind noise is likely to be amplified.

According to the external sensor attachment portion structure based on the third aspect, even in the case where the wind noise is likely to be amplified, it is possible to suppress the wind noise generated in the attachment portion of the external sensor 25 by dividing the air vortex by the turbulence effect of the noise suppression portion 43 as with the external sensor attachment portion structure based on the first or second aspect.

As the external sensor attachment portion structure based on a fourth aspect, a structure that is the external sensor attachment portion structure based on the third aspect may be adopted in which the support frame portion 36a included in the attachment bracket 35 is provided above the sensor main body 33 in the vertical direction.

According to the external sensor attachment portion structure based on the fourth aspect, since the support frame portion 36a included in the attachment bracket 35 is provided above the sensor main body 33 in the vertical direction, it is possible to expect the effect of hiding (covering up) the component members of the external sensor 25 such as the sensor main body 33 and the attachment bracket 35 excluding the detection unit 32 from the outer side of the host vehicle 11 in addition to the operations and effects of the external sensor attachment portion structure based on the third aspect.

As the external sensor attachment portion structure based on a fifth aspect, a structure that is the external sensor attachment portion structure based on the fourth aspect may be adopted in which the support frame portion 36a included in the attachment bracket 35 and the jutting wall portion 41a included in the window frame 41 are provided to extend in the substantially horizontal direction, and the extension end 41b in the rearward direction of the jutting wall portion 41a and the support frame end 36b in the frontward direction of the host vehicle 11 of the support frame portion 36a are displaced from each other in the vertical direction (see FIG. 6B).

In the external sensor attachment portion structure based on the fifth aspect, the extension end 41b of the jutting wall portion 41a in the rearward direction and the support frame end 36b of the support frame portion 36a in the frontward direction of the host vehicle 11 are displaced from each other in the vertical direction.

In this case where the extension end 41b of the jutting wall portion 41a in the rearward direction and the support frame end 36b of the support frame portion 36a in the frontward direction of the host vehicle 11 are displaced from each other in the vertical direction, the wind noise is likely to be suppressed more than in the case where the extension end 41b and the support frame end 36b are positioned at substantially the same height.

According to the external sensor attachment portion structure based on the fifth aspect, in the case where the wind noise is likely to be suppressed, it is possible to further suppress the wind noise generated in the attachment portion of the external sensor 25 by dividing the air vortex by the turbulence effect of the noise suppression portion 43 as with the external sensor attachment portion structure based on the fourth aspect.

As the external sensor attachment portion structure based on a sixth aspect, a structure that is the external sensor attachment portion structure based on the fourth or fifth aspect may be adopted in which the attachment bracket 35 includes the sensor attachment bracket (main bracket) 35 that is to be attached to the vehicle body frame member (vehicle body structure) 23 and the holding bracket 36 that holds the sensor main body 33, the holding bracket 36 is attached to the main bracket using the position adjustment mechanism 34 that adjusts the orientation of the sensor main body 33, the support frame portion 36a included in the attachment bracket 35 is a member in the holding bracket 36, and the sensor garnish 37 is attached to the main bracket of the attachment bracket 35 (see FIG. 6B).

In the external sensor attachment portion structure based on the sixth aspect, since the support frame portion 36a is a member in the holding bracket 36, and the sensor garnish 37 is attached to the main bracket of the attachment bracket 35, it is required to set the sizes of the above-described gaps GP1 and GP2 large in anticipation of the position adjustment margin for adjusting the position of the detection unit 32 of the sensor main body 33 with respect to the window frame 41 constituting the rim of the window portion 39.

According to the external sensor attachment portion structure based on the sixth aspect, even in the case where the sizes of the above-described gaps GP1 and GP2 are set large in anticipation of the position adjustment margin, it is possible to suppress the wind noise generated in the attachment portion of the external sensor 25 by dividing the air vortex by the turbulence effect of the noise suppression portion 43 as with the external sensor attachment portion structure based on the fourth or fifth aspect.

OTHER EMBODIMENTS

The above-described multiple embodiments are embodied examples of the present invention. Therefore, the technical scope of the present invention must not be construed to be limited by those embodiments. It is because the present invention can be implemented in various forms without departing from the gist and the principal characteristics of the present invention.

For example, although an example in which the external sensor 25 is provided in each of two end portions in the vehicle-width direction of the host vehicle 11 of the front bumper member 21 is described in the descriptions of the external sensor attachment portion structure according to the embodiments of the present invention, the present invention is not limited to this example. It is also possible to apply the present invention to an aspect in which the external sensor 25 is provided in each of two end portions in the vehicle-width direction of the host vehicle 11 of a (not-illustrated) rear bumper member.

What is claimed is:

1. An external sensor attachment portion structure that is used to attach an external sensor that detects external information on an object around a host vehicle to a vehicle body structure of the host vehicle, the external sensor comprising:
    a sensor main body including a detection unit that detects the external information;
    an attachment bracket used to attach the sensor main body to the vehicle body structure; and
    a sensor garnish including a window portion through which the detection unit is exposed in front view,
    wherein
    the sensor garnish is provided on an outer side of the host vehicle so as to expose the detection unit of the external sensor and cover at least the sensor main body and the attachment bracket excluding the detection unit,
    a small gap is provided between the sensor main body and a window frame constituting a rim of the window portion included in the sensor garnish,
    the window frame includes a noise suppression portion that makes a dimension of the gap uneven in a longitudinal direction thereof and suppresses wind noise due to an airflow passing through the gap along a rearward direction of the host vehicle,
    the window frame is formed in a substantially rectangular shape,
    at least a part of the window frame includes a jutting wall portion extending in the rearward direction of the host vehicle,
    the noise suppression portion is formed of an extension end of the jutting wall portion zigzagged in a waveform in a back and forth direction of the host vehicle while extending in the longitudinal direction, and
    the waveform is formed in such a manner that each wave in the waveform is shaped to be gradually smaller in size from an inner end of the jutting wall portion to an outer end of the jutting wall portion.

2. The external sensor attachment portion structure according to claim 1, wherein
    the attachment bracket includes a plate-shaped support frame portion positioned to surround at least a part of the sensor main body, and
    the noise suppression portion is provided in a portion of the window frame positioned at range in which a distance of the window frame from the support frame portion is within a predetermined distance.

3. The external sensor attachment portion structure according to claim 2, wherein
    the support frame portion included in the attachment bracket is provided above the sensor main body in a vertical direction.

4. The external sensor attachment portion structure according to claim 3, wherein
    the support frame portion included in the attachment bracket and the jutting wall portion included in the window frame are provided to extend in a substantially horizontal direction, and
    the extension end of the jutting wall portion in the rearward direction and a support frame end of the support frame portion in a frontward direction of the host vehicle are displaced from each other in the vertical direction.

5. The external sensor attachment portion structure according to claim 3, wherein
the attachment bracket includes a main bracket that is to be attached to the vehicle body structure and a holding bracket that holds the sensor main body,
the holding bracket is attached to the main bracket using a position adjustment mechanism that adjusts an orientation of the sensor main body,
the support frame portion included in the attachment bracket is a member in the holding bracket, and
the sensor garnish is attached to the main bracket of the attachment bracket.

* * * * *